(12) United States Patent
Saville

(10) Patent No.: US 7,267,523 B2
(45) Date of Patent: Sep. 11, 2007

(54) COMPOSITE SHAFT

(75) Inventor: Marshall Saville, Torrance, CA (US)

(73) Assignee: Honeywell International, Inc., Morristown, NJ (US)

( * ) Notice: Subject to any disclaimer, the term of this patent is extended or adjusted under 35 U.S.C. 154(b) by 306 days.

(21) Appl. No.: 10/834,611

(22) Filed: Apr. 28, 2004

(65) Prior Publication Data
US 2005/0244275 A1 Nov. 3, 2005

(51) Int. Cl.
F01D 25/12 (2006.01)

(52) U.S. Cl. ............... 415/1; 415/104; 415/107; 415/175; 415/177; 415/229; 415/216.1; 417/373; 417/407; 384/317; 384/476; 384/900

(58) Field of Classification Search ............ 416/1, 416/95, 174, 244 R, 244 A; 415/1, 104, 415/170.1, 107, 175, 177–178, 229, 216.1; 417/373, 407; 384/103, 317, 476, 900
See application file for complete search history.

(56) References Cited

U.S. PATENT DOCUMENTS 2,349,281 A * 5/1944 Kendall .................. 384/547
3,149,819 A 9/1964 Baumann
3,645,593 A * 2/1972 Irwin .................... 384/476
3,706,483 A 12/1972 Irwin
3,845,619 A 11/1974 O'Neill
4,725,206 A 2/1988 Glaser
4,786,238 A 11/1988 Glaser
5,087,176 A 2/1992 Wieland
5,791,868 A * 8/1998 Bosley et al. ............ 415/104
5,827,040 A * 10/1998 Bosley et al. ............ 415/106
5,921,683 A * 7/1999 Merritt et al. ............ 384/103
6,072,661 A 6/2000 Schirle
6,151,909 A * 11/2000 Carter et al. ............... 62/402
6,190,048 B1 * 2/2001 Weissert ................. 384/103

* cited by examiner

Primary Examiner—Christopher Verdier
(74) Attorney, Agent, or Firm—Oral Caglar, Esq.

(57) ABSTRACT

A turbine shaft may be used to remove a heat load from pliant bearings without requiring the use of a process fluid for cooling the turbine shaft. The turbine shaft comprises a heat conductive sleeve disposed between an outer surface of a tie rod shaft and an inner surface of a bearing journal; the heat conductive sleeve having a sleeve inner surface separated from a sleeve outer surface by a sleeve thickness; the heat conductive sleeve having a first end separated from a second end longitudinally about a center axis; the sleeve outer surface being in physical contact with the inner surface of the bearing journal; and the heat conductive sleeve having a thermal conductivity that is greater than a thermal conductivity of the bearing journal.

24 Claims, 3 Drawing Sheets

COMPOSITE SHAFT

BACKGROUND OF THE INVENTION

The present invention generally relates to an apparatus and a method for removing heat from a turbine shaft and, more specifically, to an apparatus and a method of removing heat from a turbine shaft having foil bearings by utilizing a heat conductive sleeve within the turbine shaft.

Foil bearing rotating machines may require a means of removing heat which may be generated by a shaft rotating within the bearings. Typical designs may use a process fluid such as air, to remove heat generated at the shaft-foil bearing interface. For example, U.S. Pat. No. 3,149,819 to Baumann et al. is directed to utilizing a hollow bush within a hollow cylindrical shaft extending through a gas lubricated bearing to remove heat from the bearing. In Baumann et al., the hollow bush has a higher thermal conductivity than does the hollow shaft, and the hollow bush and the hollow shaft are traversed interiorly thereof by a gaseous coolant.

U.S. Pat. Nos. 4,725,206 and 4,786,238, both to Gaser et al., are each directed to a pliant foil bearing having a plurality of foils extending about a rotatable shaft, a hollow shaft mounted to rotate within the pliant foil bearing with at least a portion of the hollow shaft comprising a bearing journal, and means for circulating a gas through the hollow shaft to cool the shaft.

Other approaches related to removal of heat from turbine shafts include U.S. Pat. No. 3,706,483 to Irwin, which is directed to removing heat from a turbine shaft comprising roller or ball bearings wherein an inner ring of a bearing may be mounted on, or be part of a hollow sleeve which in turn is mounted on a rotating shaft. The interior of the hollow sleeve may be filled with a heat conductive material such as sodium. An end of the hollow sleeve opposite the end at which the inner ring is mounted may comprise cooling fins to dissipate the heat load applied to the turbine shaft.

Conventional methods and apparatus used for removing heat from turbine shafts have disadvantages. Removing heat utilizing a cooling fluid may require utilizing a portion of the turbine output power merely for such cooling, without that portion of the output doing useful work. Accordingly, heat removal utilizing a cooling fluid may reduce the efficiency of the turbine in which this approach is used. Also, utilizing a cooling fluid for heat removal may further require providing a system by which contact between a heat load and the cooling fluid can be accomplished. Such systems may thus add complexity, weight, and cost to the overall system in opposite to design goals.

Use of a hollow sleeve heat sink in direct communication with a bearing may also limit operational parameters available for use in a turbine comprising such a system. In particular, a heat sink material may lack strength and rigidity necessary to maintain the integrity of a system when such a system is operated at rotational speeds consistent with turbine operation.

As can be seen, there is a need for apparatus and methods to remove heat from foil bearing turbine shafts which do not require utilizing a working fluid as a heat exchange medium, and which will allow for system integrity under turbine operational conditions.

SUMMARY OF THE INVENTION

In one aspect of the present invention, a turbine shaft comprises a heat conductive sleeve disposed between an outer surface of a tie rod shaft, and an inner surface of a bearing journal; the heat conductive sleeve having a sleeve inner surface separated from a sleeve outer surface by a sleeve thickness; the heat conductive sleeve having a first end separated longitudinally from a second end about a center axis; the sleeve outer surface being in physical contact with the inner surface of the bearing journal; and the heat conductive sleeve having a thermal conductivity that is greater than a thermal conductivity of the bearing journal.

In another aspect of the present invention, a turbine shaft comprises a heat conductive sleeve disposed between an outer surface of a tie rod shaft, and an inner surface of a bearing journal; the heat conductive sleeve being characterized by a circular cross section; the heat conductive sleeve having a sleeve inner surface separated from a sleeve outer surface by a sleeve thickness; the heat conductive sleeve having a first end separated longitudinally from a second end about a center axis; the sleeve outer surface being in physical contact with the inner surface of the bearing journal; at least a portion of the sleeve inner surface being physically isolated from the outer surface of the tie rod; and the heat conductive sleeve having a thermal conductivity that is greater than a thermal conductivity of the bearing journal.

In still another aspect of the present invention, a turbine shaft comprises a heat conductive sleeve having a first portion disposed between an outer surface of a tie rod shaft, and an inner surface of a pliant foil bearing journal; the first portion of the heat conductive sleeve being characterized by a circular cross section; the first portion of the heat conductive sleeve having a sleeve inner surface separated from a sleeve outer surface by a sleeve thickness; the first portion of the heat conductive sleeve having a first end separated longitudinally from a second end about a center axis; the sleeve outer surface being in physical contact with the inner surface of the pliant foil bearing journal; at least a portion of the sleeve inner surface being physically isolated from the outer surface of the tie rod; the heat conductive sleeve having a second ring portion comprising a ring extending radially away from a portion of the sleeve outer surface the second ring portion being perpendicular to the center axis; the second ring portion having a ring outer diameter; the second ring portion having a first face perpendicular to the center axis and separated longitudinally from a second face about the center axis; the first face and the second face being in physical contact with a portion of an inner surface of a thrust bearing runner; the heat conductive sleeve having a thermal conductivity that is greater than a thermal conductivity of the bearing journal and the thrust bearing runner.

In yet another aspect of the present invention, a gas turbine engine comprises a turbine wheel connected to a compressor wheel through a turbine shaft; the turbine shaft having a bearing journal; the turbine shaft mounted in a turbine housing to rotate within a pliant foil bearing having a plurality of foils extending about an outer surface of the bearing journal of the turbine shaft; the turbine shaft having a heat conductive sleeve disposed between an outer surface of a tie rod shaft, and an inner surface of the bearing journal; the heat conductive sleeve being characterized by a circular cross section; the heat conductive sleeve having a sleeve inner surface separated from a sleeve outer surface by a sleeve thickness; the sleeve outer surface being in physical contact with the inner surface of the bearing journal; the heat conductive sleeve having a first end separated longitudinally from a second end about a center axis; at least a portion of the second end of the heat conductive sleeve being in thermal communication with the compressor wheel; at least a portion of the sleeve inner surface being physically isolated from the outer surface of the tie rod; and the heat conductive sleeve having a thermal conductivity that is greater than a thermal conductivity of the bearing journal.

In yet another aspect of the present invention, a turbine shaft comprises a heat conductive sleeve having a first portion disposed between an outer surface of a tie rod shaft, and an inner surface of a pliant foil bearing journal; the first portion of said heat conductive sleeve being characterized by a circular cross section; the first portion of the heat conductive sleeve having a sleeve inner surface separated from a sleeve outer surface by a sleeve thickness; the sleeve thickness being up to about 200% that of a thickness of the pliant foil bearing journal; the first portion of the heat conductive sleeve having a first end separated longitudinally from a second end about a center axis by a length; the length of the heat conductive sleeve being greater than a length of the pliant foil bearing journal; the sleeve outer surface being in physical contact with the inner surface of the pliant foil bearing journal; at least a portion of the sleeve inner surface being physically isolated from the outer surface of the tie rod; the heat conductive sleeve having a second ring portion extending radially away from a portion of the sleeve outer surface; the second ring portion being perpendicular to the center axis; the second ring portion having a ring outer diameter; the second ring portion having a first face perpendicular to the center axis and separated longitudinally from a second face about the center axis; the first face and the second face being in physical contact with a portion of an inner surface of a pliant foil thrust bearing runner; the heat conductive sleeve having a thermal conductivity that is greater than a thermal conductivity of the pliant foil bearing journal and the thrust bearing runner.

In still another aspect of the present invention, a turbine shaft comprises a solid heat conductive element disposed radially about a center axis and within an inner surface of a bearing journal the solid heat conductive element having a solid heat conductive element outer surface in physical contact with the inner surface of the bearing journal; the solid heat conductive element having a solid heat conductive element first end separated longitudinally from a solid heat conductive element second end about the center axis; the solid heat conductive element having a thermal conductivity that is greater than a thermal conductivity of the bearing journal.

In still another aspect of the present invention, a method of removing heat from a pliant foil bearing in a turbine comprises the steps of: disposing a turbine shaft in contact with a pliant foil bearing; thermally contacting an end of the turbine shaft with a compressor wheel of the turbine; and rotating the turbine shaft, wherein the turbine shaft includes: a heat conductive sleeve disposed between an outer surface of a tie rod shaft, and an inner surface of a bearing journal of the pliant foil bearing; the heat conductive sleeve having a sleeve inner surface separated from a sleeve outer surface by a sleeve thickness; the sleeve outer surface being in physical contact with the inner surface of the bearing journal; the heat conductive sleeve having a first end separated longitudinally from a second end about a center axis; the second end being in physical contact with the compressor wheel of the turbine; and the heat conductive sleeve having a thermal conductivity that is greater than a thermal conductivity of the bearing journal.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides a turbine shaft that may include a heat conductive sleeve which may be disposed between an outer surface of a tie rod shaft, and an inner surface of a bearing journal. This is unlike the prior art, wherein a heat conductive sleeve may be disposed within a shaft, or may be disposed about a circumference of a shaft to be in physical contact with a rolling element bearing race.

In an embodiment, the present invention may also provide for a heat conductive sleeve which may have a thermal conductivity that may be greater than the bearing journal to which the heat conductive sleeve may be in physical communication with. This too is unlike the prior art, which may be silent as to the thermal conductivity of a bush or hollow sleeve.

In another embodiment, the present invention may also provide for a heat conductive sleeve disposed between an inner surface of a bearing journal and an outer surface of a tie rod shaft, in which at least a portion of an inner surface of the sleeve may be physically isolated from the outer surface of the tie rod shaft. This too is unlike the prior art, which may not include a tie rod shaft, but instead may include a hollow shaft through which a fluid may be directed.

In still another embodiment of the present invention, a second ring portion of the heat conductive sleeve extends radially away from an outer surface of the heat conductive sleeve, which may be in physical contact with an inner surface of a thrust bearing runner. This is also unlike the prior art, which may not provide for a heat conductive sleeve in thermal contact with a thrust bearing runner.

Figure 1:
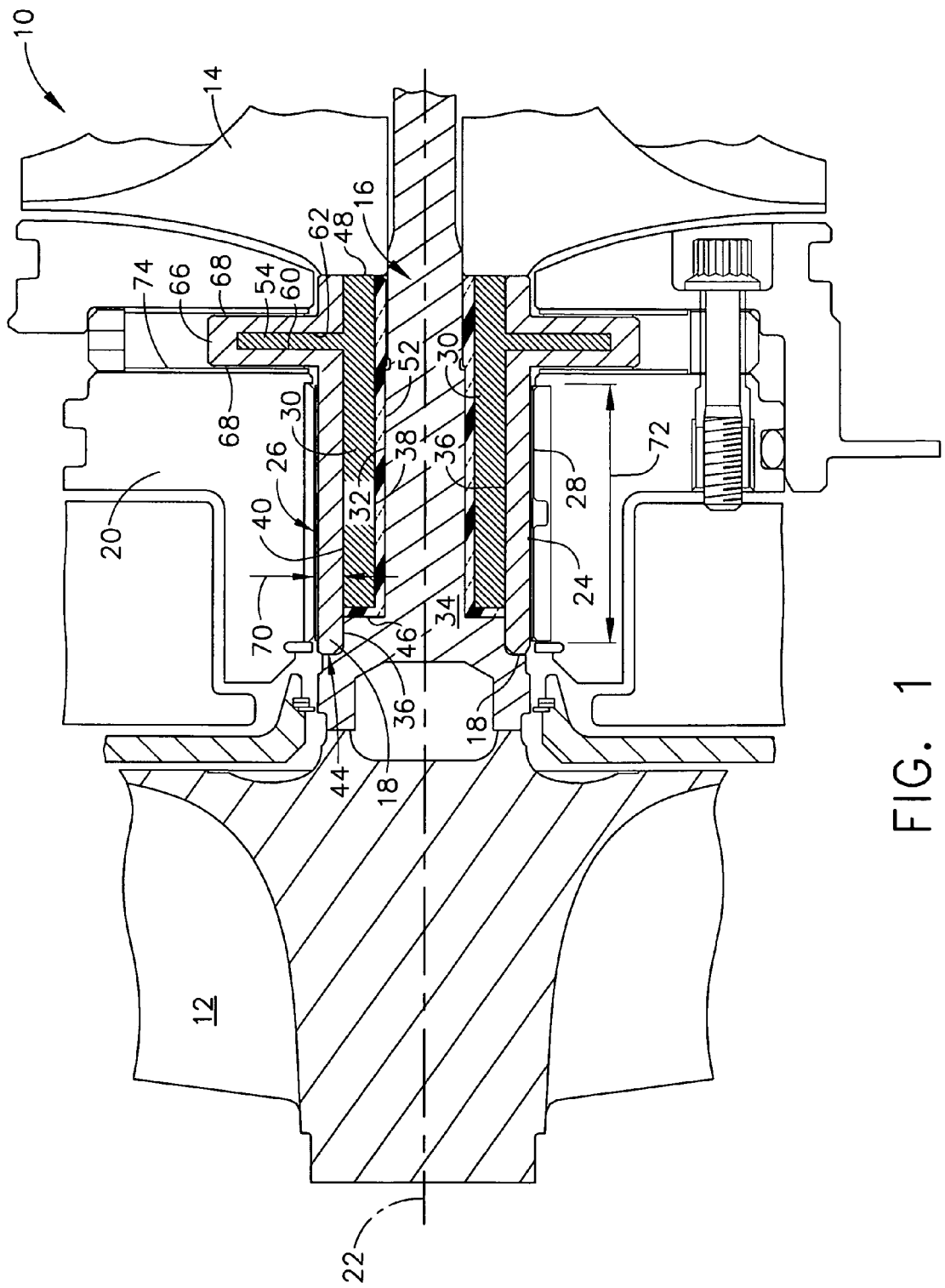
FIG. 1 shows a cross sectional view of a gas turbine engine of the present invention.

Referring to FIG. 1, a cross-sectional view of a gas turbine engine, generally referred to as 10, is shown. Gas turbine engine 10 may include a turbine wheel 12 connected to a compressor wheel 14 through a turbine shaft, represented generally as 16. Turbine shaft 16 may include a tie rod shaft 34, that may clamp or otherwise attach turbine 12 and compressor 14 to turbine shaft 16. At least one bearing journal 18 may be mounted in a turbine housing 20 to be rotatable about a center axis 22. Bearing journal 18 may have an outer surface 24 in contact with a pliant foil bearing 26. Pliant foil bearing 26 may have one or more foils 28 extending about outer surface 24 of bearing journal 18 of tie rod shaft 34, which may thus include a composite of various materials. Bearing journal 18 may comprise a material having a modulus of elasticity of at least about 20 Mpsi (mega pounds square inch).

In an embodiment of the present invention, turbine shaft 16 may include tie rod shaft 34 having a heat conductive sleeve 30 disposed between an outer surface 32 of a tie rod shaft 34, and an inner surface 36 of bearing journal 18. In an embodiment, heat conductive sleeve 30 may have a sleeve outer surface 40 that may be in physical contact with inner surface 36 of bearing journal 18. Bearing journal 18 may also be in mechanical communication with both turbine wheel 12 and compressor wheel 14 through, for example, physical contact with tie rod shaft 34 represented by arrow 44 in FIG. 1. Accordingly, heat conductive sleeve 30 may also be in mechanical communication with turbine wheel 12, compressor wheel 14, and tie rod shaft 34, through physical contact with inner surface 36 of bearing journal 18.

Figure 2:
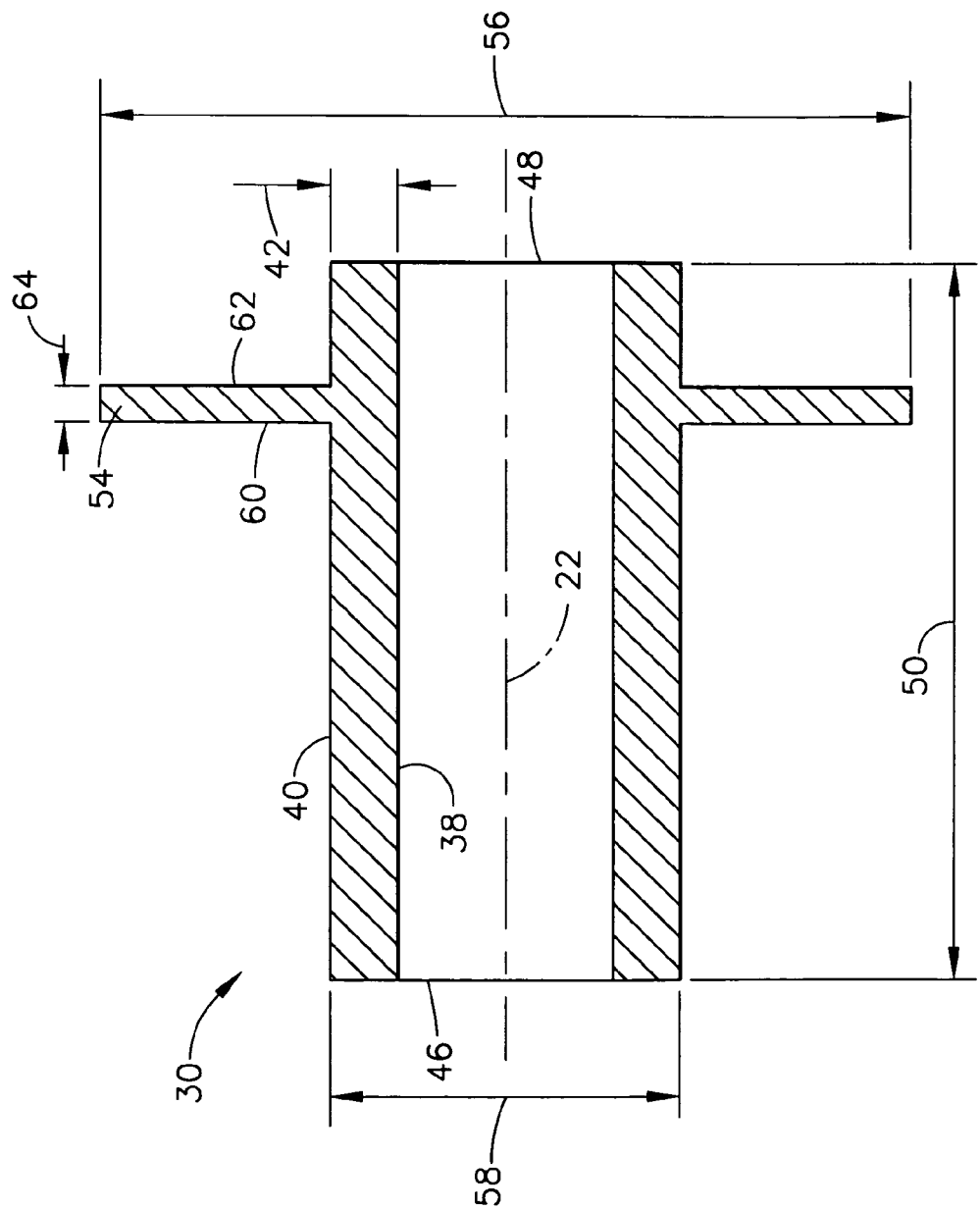
FIG. 2 shows cross sectional view of the heat conductive sleeve shown in FIG. 1 in isolation.

Referring now to FIG. 2, which shows a cross sectional view of an embodiment of heat conductive sleeve 30 taken longitudinally about center axis 22, heat conductive sleeve 30 may have a sleeve inner surface 38 which may be separated from sleeve outer surface 40 by a sleeve thickness 42. Heat conductive sleeve 30 may also have a first end 46 separated longitudinally from a second end 48 about center axis 22 by a length 50.

As shown in the embodiment of FIG. 1, at least a portion of second end 48 of heat conductive sleeve 30 may be in thermal communication with compressor wheel 14.

In an embodiment, as is also shown in FIG. 1, at least a portion of sleeve inner surface 38 may be physically isolated from outer surface 32 of tie rod 34 by an insulator 52 disposed therebetween. An insulator 52 may include a gas such as air, an insulating liquid, a ceramic insulator (not shown), a partial vacuum, or the like that may retard or inhibit thermal communication between tie rod shaft 34 and heat conductive sleeve 30.

Figure 3:
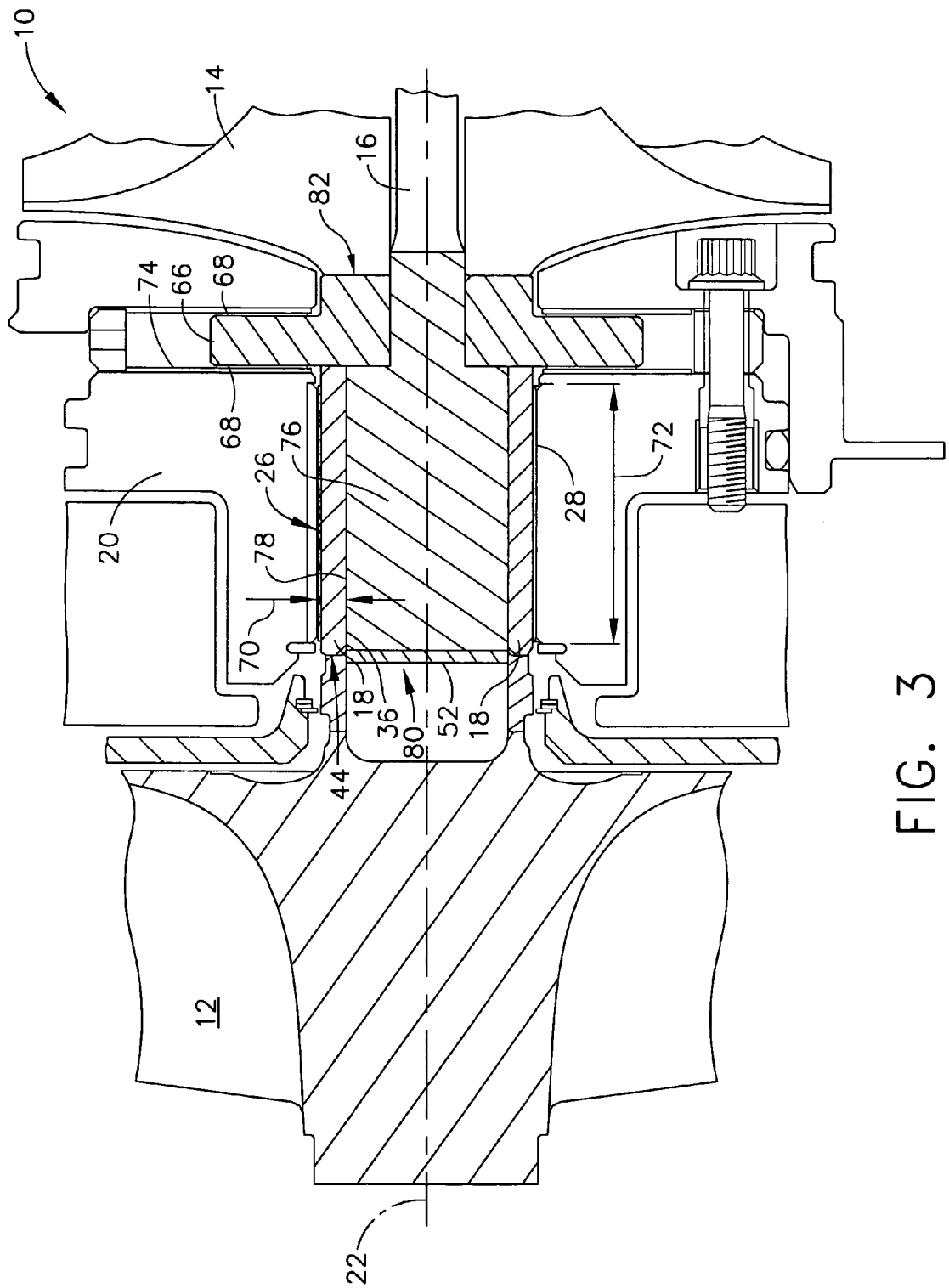
FIG. 3 shows a cross sectional view of another embodiment of a gas turbine engine of the present invention.

As shown in FIG. 3, in an alternative embodiment, turbine shaft 16 may not include a tie rod shaft connecting turbine wheel 12 and compressor wheel 14. Turbine wheel 12 may be a single piece with journal 18, or may be attached by, for example, a welding process. As such turbine shaft 16 may include a solid heat conductive element 76 disposed radially about center axis 22 and within inner surface 36 of bearing journal 18. The solid heat conductive element 76 may have a solid heat conductive element outer surface 78 in physical contact with inner surface 36 of bearing journal 18. Solid heat conductive element 76 may also have a solid heat conductive element first end 80 separated longitudinally from a solid heat conductive element second end 82 about center axis 22. In an embodiment, solid heat conductive element first end 80 may be separated from turbine wheel 12 by insulator 52 which may be a gas or partial vacuum. To aid in disassembly and maintenance, thrust disk 66 may be a separate assembly which engages turbine shaft 16. Thrust disk 66 may be of the same, or of a different heat conductive material as is solid heat conductive element 76.

As shown in FIG. 2, heat conductive sleeve 30 may also include a second ring portion 54 which may include a ring that may be attached to, and which may extend radially away from, a portion of sleeve outer surface 40. In an embodiment, second ring portion 54 may be arranged essentially perpendicular to center axis 22. The second ring portion 54 may have a ring outer diameter 56 in excess of an outer diameter 58 of heat conductive sleeve 30. In an embodiment, second ring portion 54 may have a first face 60 which may be disposed perpendicular to center axis 22, and which may be separated longitudinally about center axis 22 from a second face 62, by a ring thickness 64. In an embodiment, length 50 of heat conductive sleeve 30 may be longer than a length 72 (see FIG. 1) of pliant foil bearings 26.

As shown in FIG. 1, first face 60 and second face 62 may be disposed within gas turbine engine 10 to be in physical and thermal contact with at least a portion of an inner surface 74 of a thrust bearing runner 66. In an embodiment, thrust bearing runner 66 may be in sliding contact with pliant foil thrust bearings 68 disposed within turbine housing 20.

Heat conductive sleeve 30, and/or solid heat conductive element 76 may comprise a material having a thermal conductivity which may be greater than the thermal conductivity of at least one of bearing journal 18, turbine housing 20, and tie rod shaft 34. In an embodiment, heat conductive sleeve 30 and/or solid heat conductive element 76 may comprise a material having a thermal conductivity of at least about 50 watts per meter degree Kelvin (W/m ° K). In another embodiment, heat conductive sleeve 30 and/or solid heat conductive element 76 comprising a material having a thermal conductivity of at least about 300 W/m ° K may be preferred. In still another embodiment, heat conductive sleeve 30 and/or solid heat conductive element 76 comprising a material having a thermal conductivity of at least about 390 W/m ° K may be still more preferred. Accordingly, heat conductive sleeve 30 and/or solid heat conductive element 76 may comprise copper, aluminum, and/or silver metal. In another embodiment, heat conductive sleeve 30 and/or solid heat conductive element 76 comprising copper or an alloy of copper may be preferred. In addition, the heat conductive sleeve 30 and/or solid heat conductive element 76 may comprise a ceramic material, a carbon graphite material and/or an impregnated carbon graphite material. Consequently, heat conductive sleeve 30 and/or solid heat conductive element 76 may comprise at least one of copper, aluminum, silver, a ceramic material, a carbon graphite material, or an impregnated carbon graphite material.

In an embodiment, heat conductive sleeve 30 and/or solid heat conductive element 76 may be characterized by an essentially circular cross section (i.e., circular within design and production limitations). In another embodiment, sleeve thickness 42 of heat conductive sleeve 30 may be about 1% to about 10,000% that of a journal thickness 70 of bearing journal 18. In another embodiment, sleeve thickness 42 of about 50% to about 200% that of journal thickness 70 may be preferred.

In an embodiment, heat conductive sleeve 30 and/or solid heat conductive element 76 may be pressed into frictional or mechanical contact with inner surface 36 of bearing journal 18. In still another embodiment, heat conductive sleeve 30 and/or solid heat conductive element 76 may be metallurgically bonded by welding, brazing, diffusion, plating or otherwise chemically attached to inner surface 36 of bearing journal 18 such that physical and thermal contact between heat conductive sleeve 30 and/or solid heat conductive element 76 and bearing journal 18 may be provided.

In operation, compressor wheel 14 may have a temperature that may be less than a temperature of pliant foil bearing 26, turbine wheel 12, and/or pliant foil thrust bearing 68. As such, heat conductive sleeve 30 and/or solid heat conductive element 76 may provide thermal communication between compressor wheel 14, and a heat load generated by pliant foil bearing 26, pliant foil thrust bearing 68, and/or by heat conveyed through turbine wheel 12 in gas turbine engine 10 as described above.

Accordingly, in an embodiment of the present invention, a method of removing heat from a pliant foil bearing may include the steps of disposing a bearing journal 18 in contact with a pliant foil bearing 26 and rotating bearing journal 18, wherein bearing journal 18 includes a heat conductive sleeve 30 disposed between an outer surface 32 of a tie rod shaft 34, and an inner surface 36 of a bearing journal 18 and/or solid heat conductive element 76 disposed within inner surface 36 of bearing journal 18 such that sleeve outer surface 32, or solid heat conductive element outer surface 78 may be in physical contact with inner surface 36 of bearing journal 18;

and such that an end (e.g., second end 48) of heat conductive sleeve 30 or solid heat conductive element second end 82 may be in thermal communication with compressor wheel 14.

In an embodiment, the turbine wheel 12 may also be the same temperature or may be cooler than the compressor wheel 14, for example, in a cooling turbine for an air cycle refrigeration system (not shown). Thus, heat may also be conducted to the turbine wheel 12 and/or the compressor wheel 14. In an embodiment, the turbine wheel may be cooler than the compressor wheel and the compressor wheel may be warmer than the bearings. In this case, the compressor wheel position may be interchanged with the turbine wheel in FIGS. 1 and 3.

It should be understood, of course, that the foregoing relates to preferred embodiments of the invention and that modifications may be made without departing from the spirit and scope of the invention as set forth in the following claims.

I claim:

1. A turbine shaft comprising:
   a heat conductive sleeve disposed between an outer surface of a tie rod shaft, and an inner surface of a bearing journal;
   said heat conductive sleeve having a sleeve inner surface separated from a sleeve outer surface by a sleeve thickness;
   an insulator disposed between said sleeve inner surface and said outer surface of said tie rod shaft;
   said heat conductive sleeve having a first end separated longitudinally from a second end about a center axis;
   said sleeve outer surface being in physical contact with said inner surface of said bearing journal; and
   said heat conductive sleeve having a thermal conductivity that is greater than a thermal conductivity of said bearing journal.

2. The turbine shaft of claim 1, wherein said sleeve inner surface is not in physical contact with said outer surface of said tie rod shaft.

3. The turbine shaft of claim 1, wherein said insulator is air.

4. The turbine shaft of claim 1, wherein said heat conductive sleeve has a thermal conductivity of at least about 50 watts per meter degree Kelvin.

5. The turbine shaft of claim 1, wherein said heat conductive sleeve has a thermal conductivity of at least about 390 watts per meter degree Kelvin.

6. The turbine shaft of claim 1, wherein said heat conductive sleeve comprises at least one of copper, aluminum, silver, a ceramic material, a carbon graphite material, or an impregnated carbon graphite material.

7. The turbine shaft of claim 1, wherein said sleeve thickness is about 1% to about 10,000% that of a thickness of said bearing journal.

8. The turbine shaft of claim 1, wherein said sleeve thickness is about 50% to about 200% that of a thickness of said bearing journal.

9. The turbine shaft of claim 1, wherein said bearing journal comprises a material having a modulus of elasticity of at least about 20 Mpsi.

10. The turbine shaft of claim 1, wherein said bearing journal is a pliant foil bearing journal.

11. A turbine shaft comprising:
    a heat conductive sleeve disposed between an outer surface of a tie rod shaft, and an inner surface of a bearing journal;
    said heat conductive sleeve being characterized by a circular cross section;
    said heat conductive sleeve having a sleeve inner surface separated from a sleeve outer surface by a sleeve thickness;
    said heat conductive sleeve having a first end separated longitudinally from a second end about a center axis;
    said second end of said conductive sleeve being in thermal communication with a compressor wheel;
    said sleeve outer surface being in physical contact with said inner surface of said bearing journal;
    at least a portion of said sleeve inner surface being physically isolated from said outer surface of said tie rod; and
    said heat conductive sleeve having a thermal conductivity that is greater than a thermal conductivity of said bearing journal.

12. The turbine shaft of claim 11, wherein said bearing journal is a pliant foil bearing journal.

13. The turbine shaft of claim 11, wherein said sleeve outer surface of said heat conductive sleeve is pressed into frictional or mechanical contact with said inner surface of said bearing journal.

14. The turbine shaft of claim 11, wherein said sleeve outer surface of said heat conductive sleeve is metallurgically bonded by welding, brazing, diffusion, or plating to said inner surface of said bearing journal.

15. A turbine shaft comprising:
    a heat conductive sleeve having a first portion disposed between an outer surface of a tie rod shaft, and an inner surface of a pliant foil bearing journal;
    said first portion of said heat conductive sleeve being characterized by a circular cross section;
    said first portion of said heat conductive sleeve having a sleeve inner surface separated from a sleeve outer surface by a sleeve thickness;
    said first portion of said heat conductive sleeve having a first end separated longitudinally from a second end about a central axis;
    said sleeve outer surface being in physical contact with said inner surface of said pliant foil bearing journal;
    at least a portion of said sleeve inner surface being physically isolated from said outer surface of said tie rod;
    said heat conductive sleeve having a second ring portion comprising a ring extending radially away from a portion of said sleeve outer surface;
    said second ring portion being perpendicular to said center axis;
    said second ring portion having a ring outer diameter;
    said second ring portion having a first face perpendicular to said center axis and separated longitudinally from a second face about said center axis;
    said first face and said second face being in physical contact with a portion of an inner surface of a pliant foil thrust bearing runner;
    said heat conductive sleeve having a thermal conductivity that is greater than a thermal conductivity of said pliant foil bearing journal and said thrust bearing runner.

16. The turbine shaft of claim 15, wherein a length of said heat conductive sleeve, is greater than a length of said pliant foil bearing journal.

17. The turbine shaft of claim 15, wherein said second end of said heat conductive sleeve is in thermal communication with a compressor wheel.

18. The turbine shaft of claim 15, wherein said heat conductive sleeve comprises copper or a copper alloy.

19. The turbine shaft of claim 15, wherein said sleeve thickness is about 1% to about 10,000% that of a thickness of said pliable foil bearing journal.

20. A gas turbine engine comprising:
a turbine wheel connected to a compressor wheel through a turbine shaft;
said turbine shaft having a bearing journal;
said turbine shaft mounted in a turbine housing to rotate within a pliant foil bearing having one or more foils extending about an outer surface of said bearing journal of said turbine shaft;
said turbine shaft having a heat conductive sleeve disposed between an outer surface of a tie rod shaft and an inner surface of said bearing journal;
said heat conductive sleeve being characterized by a circular cross section;
said heat conductive sleeve having a sleeve inner surface separated from a sleeve outer surface by a sleeve thickness;
said sleeve outer surface being in physical contact with said inner surface of said bearing journal;
said heat conductive sleeve having a first end longitudinally separated from a second end about a center axis;
at least a portion of said second end of said heat conductive sleeve being in thermal communication with said compressor wheel;
at least a portion of said sleeve inner surface being physically isolated from said outer surface of said tie rod; and
said heat conductive sleeve having a thermal conductivity that is greater than a thermal conductivity of said bearing journal.

21. The gas turbine engine of claim 20, wherein said turbine shaft has one or more pliant foil bearing journals.

22. A turbine shaft comprising:
a heat conductive sleeve having a first portion disposed between an outer surface of a tie rod shaft, and an inner surface of a pliant foil bearing journal;
said first portion of said heat conductive sleeve being characterized by a circular cross section;
said first portion of said heat conductive sleeve having a sleeve inner surface separated from a sleeve outer surface by a sleeve thickness;
said sleeve thickness being about 200% that of a thickness of said pliant foil bearing journal;
said first portion of said heat conductive sleeve having a first end separated longitudinally from a second end about a center axis by a length;
said length of said first portion of said heat conductive sleeve being greater than a length of said pliant foil bearing journal;
said sleeve outer surface being in physical contact with said inner surface of said pliant foil bearing journal;
at least a portion of said sleeve inner surface being physically isolated from said outer surface of said tie rod;
said heat conductive sleeve having a second ring portion extending radially away from a portion of said sleeve outer surface;
said second ring portion being perpendicular to said center axis;
said second ring portion having a ring outer diameter;
said second ring portion having a first face perpendicular to said center axis and separated longitudinally from a second face about said center axis;
said first face and said second face being in physical contact with a portion of an inner surface of a pliant foil thrust bearing runner;
said heat conductive sleeve having a thermal conductivity that is greater than a thermal conductivity of said pliant foil bearing journal and said thrust bearing runner.

23. A method of removing heat from a pliant foil bearing in a turbine comprising the steps of:
disposing a turbine shaft in contact with said pliant foil bearing;
thermally contacting an end of said turbine shaft with a compressor wheel of said turbine; and
rotating said turbine shaft;
wherein said turbine shaft includes:
a heat conductive sleeve disposed between an outer surface of a tie rod shaft, and an inner surface of a bearing journal of said pliant foil bearing;
said heat conductive sleeve having a sleeve inner surface separated from a sleeve outer surface by a sleeve thickness;
said sleeve outer surface being in physical contact with said inner surface of said bearing journal;
said heat conductive sleeve having a first end separated longitudinally from a second end about a center axis;
said second end being in thermal contact with said compressor wheel of said turbine; and
said heat conductive sleeve having a thermal conductivity that is greater than a thermal conductivity of said bearing journal.

24. The method of claim 23, wherein said compressor wheel has a lower temperature than said bearing journal.

* * * * *